Patented Nov. 7, 1939

2,179,040

UNITED STATES PATENT OFFICE 2,179,040

PROCESS OF POLYMERIZATION IN THE GASEOUS STATE

Werner Heuer, Hofheim, Germany, assignor to I. G. Farbenindustrie Aktiengesellschaft, Frankfort-on-the-Main, Germany No Drawing. Application September 22, 1936, Serial No. 102,017. In Germany September 28, 1935

5 Claims. (Cl. 260—86)

The present invention relates to a process of preparing polymerization products.

Monomeric compounds, such as vinyl chloride, vinylmethylether, ethylene oxide, butadiene, could hitherto only be polymerized in an industrially useful manner by carrying out the reaction in a closed vessel with application of pressure, since the polymerization of such monomeric compounds in a gaseous state occurs only very slowly.

Now I have found that it is possible to carry out the polymerization of monomeric compounds in the state of gas or vapor in the presence of an indifferent liquid if care is taken that the gas or the vapor come into close contact for a sufficiently long period or with as great a surface as possible, with the liquid wherein the gas is to be polymerized. This may, for instance, be attained by the following method of operation: The gas to be polymerized is allowed to ascend in the form of very fine small bubbles through a high column of liquid with addition of accelerators and if necessary at a raised temperature, for instance by forcing it through a glass filter. During this operation most of the gaseous monomeric compounds is polymerized before reaching the surface of the liquid. The rising of the gas may be retarded by different methods for instance, by causing the gas to pass through the liquid in a spiral tube. Portions which are not being polymerized may be eliminated and subjected again to the reaction until the whole has been polymerized. The longer the time of contact of the monomeric gas with the liquid and the finer the state of distribution of the gas, i. e. the higher is, for instance, the column of liquid and the finer the small bubbles, the greater is the portion of the polymerized product. The rising of the gas may also be retarded by using liquids of high viscosities. This may be attained, for instance, by using solutions of substances having a high molecular weight (such as, an aqueous solution of polyvinyl alcohol, gelatin, hydroxyethylated cellulose) the yield of the polymerization being increased thereby. As monomeric compounds capable of being polymerized there may be used vinyl chloride, vinylmethylether, butadiene; furthermore vinylethylether, vinylformate, the latter, for instance, in the presence of benzine as indifferent liquid. Mixtures of gases or vapors of different monomeric compounds may also be subjected to this process. To the indifferent liquid there may likewise be added another monomeric or liquid compound capable of being polymerized which then forms a mixed polymerizate together with the gaseous monomeric component. Such compounds are, for instance vinyl acetate, vinyl propionate, vinyl butyrate, acrylic acid methylester and acrylic acid ethylester, acrylic acid nitrile, maleic acid, maleic acid ethylester, maleic anhydride.

As a liquid wherein the monomeric gas is to be polymerized, there may suitably be used an agent which does not dissolve the gas or which only partly dissolves the gas, because the substance to be polymerized must be maintained in the gaseous phase. Above all, water is a suitable liquid because most of the monomeric compounds are insoluble or only sparingly soluble in water, but are soluble in most organic solvents. Instead of water, there may be used according to the solubility properties of the monomeric compound, paraffin hydrocarbons, such as hexane, heptane, octane, benzine; furthermore chlorinated hydrocarbons such as ethylene chloride, methylene chloride, trichloroethylene, chlorinated benzene or chlorinated toluene. A solvent (alcohol, acetone) may also be added if necessary to the non-solvent (water) but care must be taken that the solubility is not increased to such an extent that the gaseous phase disappears. Into the liquid there may be introduced the usual polymerization accelerators, for instance, alkali persulfates, alkali perborates, acetyl peroxide, benzoyl peroxide or oleyl peroxide.

In the case of monomeric compounds which are gaseous at room temperature the operation may be conducted at room temperature; the polymerization may, however, be accelerated by application of raised temperatures which must lie below the boiling point of the indifferent liquid. Such monomeric products boiling above room temperature are heated and brought in contact in the gaseous state with the indifferent liquid heated to a corresponding temperature.

In comparison with the hitherto known processes of polymerizing monomeric compounds the new process has the advantage that it is not necessary to carry out the polymerization in a closed vessel. The process may be conducted at any desired pressure and it will therefore be possible to operate practically at the prevailing atmospheric pressure. When the polymerization suddenly and violently sets in it is practically impossible for overpressures to occur, so that danger of explosion which is considerable, for instance, when working with ethyleneoxide, does not exist.

The gases or vapors to be polymerized may be added to the liquid agent from below in a fine distribution through nozzles, filter candles and the like. The procedure may also be as follows: The vessel is partly filled with the liquid containing the catalyst to which there are added, if necessary emulsifying agents and (or) other solid or liquid monomeric compounds which are to take part in polymerization. The gas space above the liquid is filled, with expulsion of the air, with the gas to be polymerized and by an intensive stirring the gas is finely distributed in the liquid. The same quantity of the gaseous monomeric compound which is consumed by the polymerization is replaced from a gas meter or another gas container. In order to attain special effects it may be suitable to maintain the gas in the vessel under a slight overpressure.

The following examples serve to illustrate the invention, but they are not intended to limit it thereto, the parts being by weight:

(1) Into the lower part of a glass tower having a height of 2 meters and a width of 4 centimeters and provided with an internal spiral glass tube, vinyl chloride is introduced through a fine nozzle in such a manner that the fine small gas bubbles slowly ascend in the spiral tube. The tower is filled with an aqueous solution of potassium persulfate of 1 per cent strength maintained by a jacket heating at a temperature of about 50° C. to about 60° C. The vinyl chloride to be introduced is suitably preheated to the reaction temperature. The current of gas is regulated in such a manner that about 1 liter of gas passes through the apparatus within half an hour. The liquid in the tower becomes turbid only a short time and is slowly transformed into a white extraordinarily stable emulsion of polyvinyl chloride in water. The increase in the quantity of freshly formed polymeric compound in the emulsion may conveniently be followed by the increase of the density. The monomeric compound which has not yet reacted is again introduced into the tower. After the desired concentration is attained the emulsion is coagulated by salting it out with sodium chloride, the polymerization product which has separated is filtered with suction and washed with water until it is free from the electrolyte. The resulting snow-white finely pulverized polymerization product shows very good solubility properties and has the properties of a relatively highly polymerized polyvinyl chloride.

(2) Into the lower part of a glass tower of the same dimensions as that described in Example 1 but containing no spiral tube vinyl chloride is forced through a filter candle from kieselguhr, so that the gas ascends in an extremely fine distribution in the aqueous solution of 1 per cent strength of sodium perborate contained in the tower. When the gas passes through the fine pores of the filter candle the small gas bubbles are electrically charged; this prevents the formation of greater bubbles. (See H. Kautsky and H. Thiele: "Zeitschrift für anorganische und allgemeine Chemie" 152, pages 342-346). By the fine distribution of the small gas bubbles a large surface is provided and the small gas bubbles ascend only very slowly in the column of liquid. The temperature in the tower is maintained at 50° C. to 60° C. The turbidity, due to the polymerization of the vinyl chloride is visible after only a few minutes. When 1 liter of gas passes within half an hour through the mixture the yield of the polymerization is increased in this example in comparison with that of Example 1. The polymerization product obtained resembles in its properties, that obtained in Example 1 and is distinguished by its good solubility.

(3) Into the lower part of the glass tower described in Example 1 containing the glass spiral and filled with an aqueous solution of 1 per cent strength of potassium per sulfate a current of vinyl chloride is introduced through a fine nozzle in such a manner that the current of gas continuously carries a certain quantity of vinyl acetate preheated to 50° C. to 60° C. The quantities of gas and vinyl acetate are regulated in such a manner that for 1 liter of vinyl chloride gas 2 grams of vinyl acetate are introduced into the zone of reaction of the tower. The temperature of the tower is maintained at 70° C. to 80° C. Turbidity very rapidly appears in the liquid in the reaction tower. The emulsion obtained is coagulated with sodium chloride after the desired concentration has been attained, the polymerization product which has separated is washed until free from electrolytes and dried.

A white powdery mass is obtained which dissolves in esters, ketones and chlorinated hydrocarbons to form solution of high viscosity, partly also in aromatic hydrocarbons, but which is insoluble in alcohols and aliphatic hydrocarbons.

(4) It is also possible to carry out the polymerization according to the present process in a closed vessel provided with a rapid stirrer. The closed vessel is charged, for instance, with a solution of 15 parts of potassium persulfate in 1000 parts of water and the air still contained in the vessel is expelled by gaseous vinyl chloride. 10 parts of maleic acid dimethyl ester are introduced while well stirring and the reaction temperature is adjusted to 40° C. to 45° C. After some time the polymerization sets in. The vinyl chloride which is thereby consumed from the gas space above the liquid is replaced from a gas meter and the quantity of the vinyl chloride used is continuously observed. After the absorption of 90 parts of vinyl chloride, further 10 parts of maleic acid dimethylester are introduced into the vessel and the process is continued until further 90 parts of gas have been consumed. In this manner there are polymerized in all 100 parts of maleic acid dimethylester and 900 parts of vinyl chloride. The polymerization product is obtained in a finely granular state capable of being filtered. Throughout the whole reaction the pressure does not rise above the atmospheric pressure.

(5) 21 parts of potassium persulfate and 7 parts of secondary sodium phosphate are dissolved in 700 parts of water in a vessel provided with a rapid stirrer, pipes for supplying of liquid and gas and an outlet for gas. The vessel is connected with a gas meter containing vinyl chloride gas. The air in the vessel is first displaced by vinyl chloride gas, the gas outlet pipe is closed and the whole is heated to the reaction temperature of 50° C. 5 parts of vinyl acetate are then added and the rapid stirrer is set in motion. After a short time the gas is intensively absorbed with formation of an emulsion in the vessel. A quantity of gas is then allowed to enter the vessel so that the molecular proportion of the vinyl acetate which was initially introduced to the vinyl chloride is 1:1. A further like quantity of vinyl acetate is then introduced and the operation is repeated until the entire quantity of vinyl acetate is used. At the end of the reaction an emulsion is obtained which contains a mixed polymerization product of vinyl chloride and vinyl acetate in molecular proportions. This emulsion is coagulated with sodium chloride and the coagulum is washed in a centrifuge mill until it is free from the electrolyte. The mixed polymerization product obtained may be used for various purposes as artificial material.

(6) According to the method of operation described in Example 5 a mixed polymerization product from maleic anhydride and vinyl-methylether may be prepared in the following manner: Into a large vessel provided with a rapid stirrer there are introduced 225 parts of ethylene chloride, 150 parts of high-boiling benzine, 37.5 parts of maleic anhydride and 0.8 part of benzoyl peroxide. The air in the vessel is displaced by vinylmethylether and the reaction mixture is heated to a temperature of about 80° C. to about 90° C. Upon setting the rapid stirrer in motion the polymerization which immediately sets in is perceptible owing to the intensive absorption of gas. The mixed polymerization product separates in the form of fine grains. The polymerization is finished when gas is no longer absorbed. The product is filtered with suction, washed with benzine and dried.

(7) According to the method of operating described in Example 5 a mixed polymerization product from butadiene and acryl nitrile is prepared in a vessel provided with a rapid stirrer. Into the vessel there are introduced 500 parts of water, 15 parts of potassium persulfate, 5 parts of potassium pyrophosphate and 15 parts of sodium hydroxyoctodecane sulfonate. The air in the vessel is displaced by butadiene and the whole is heated to 50° C. 5 parts of acryl nitrile are added and the whole is well stirred whereupon the polymerization sets in with the absorption of butadiene. When the gas is no longer absorbed about 5 parts of butadiene have been consumed. Further 5 parts of acryl nitrile are again introduced and the process is continued until the same quantity of butadiene has again been consumed.

The mixed polymerization product is obtained in the form of an emulsion and may be obtained therefrom in the form of a solid, colorless powder in the usual manner by acidifying, heating or salting out.

I claim:
1. The process which comprises polymerizing gaseous vinyl chloride in intimate contact with an indifferent liquid substantially incapable of dissolving the said gaseous vinyl chloride and containing a polymerization catalyst under such conditions that the monomeric vinyl chloride is maintained in the gaseous state.

2. The process which comprises polymerizing gaseous vinyl chloride together with a normally liquid monomeric compound copolymerizable therewith in intimate contact with an indifferent liquid substantially incapable of dissolving said monomeric compounds and containing a polymerization catalyst under such conditions that the monomeric vinyl chloride is maintained in the gaseous state.

3. The process which comprises polymerizing gaseous vinyl chloride together with vinyl acetate in intimate contact with an indifferent liquid substantially incapable of dissolving said monomeric compounds and containing a polymerization catalyst under such conditions that the monomeric vinyl chloride is maintained in the gaseous state.

4. The process which comprises polymerizing gaseous monomeric vinyl chloride by causing the same to ascend in the form of fine bubbles through water heated at about 50° C. to about 60° C. and containing potassium persulfate under such conditions that the monomeric vinyl chloride is maintained in the gaseous state.

5. The process which comprises polymerizing gaseous vinyl chloride together with vinyl acetate by bringing the gaseous vinyl chloride into intimate contact with thoroughly stirred water containing vinyl acetate and potassium persulfate under such conditions that the monomeric vinyl chloride is maintained in the gaseous state.

WERNER HEUER.